Inventor,
John D. Winters,
By: Schneider & Dressler, Attys.

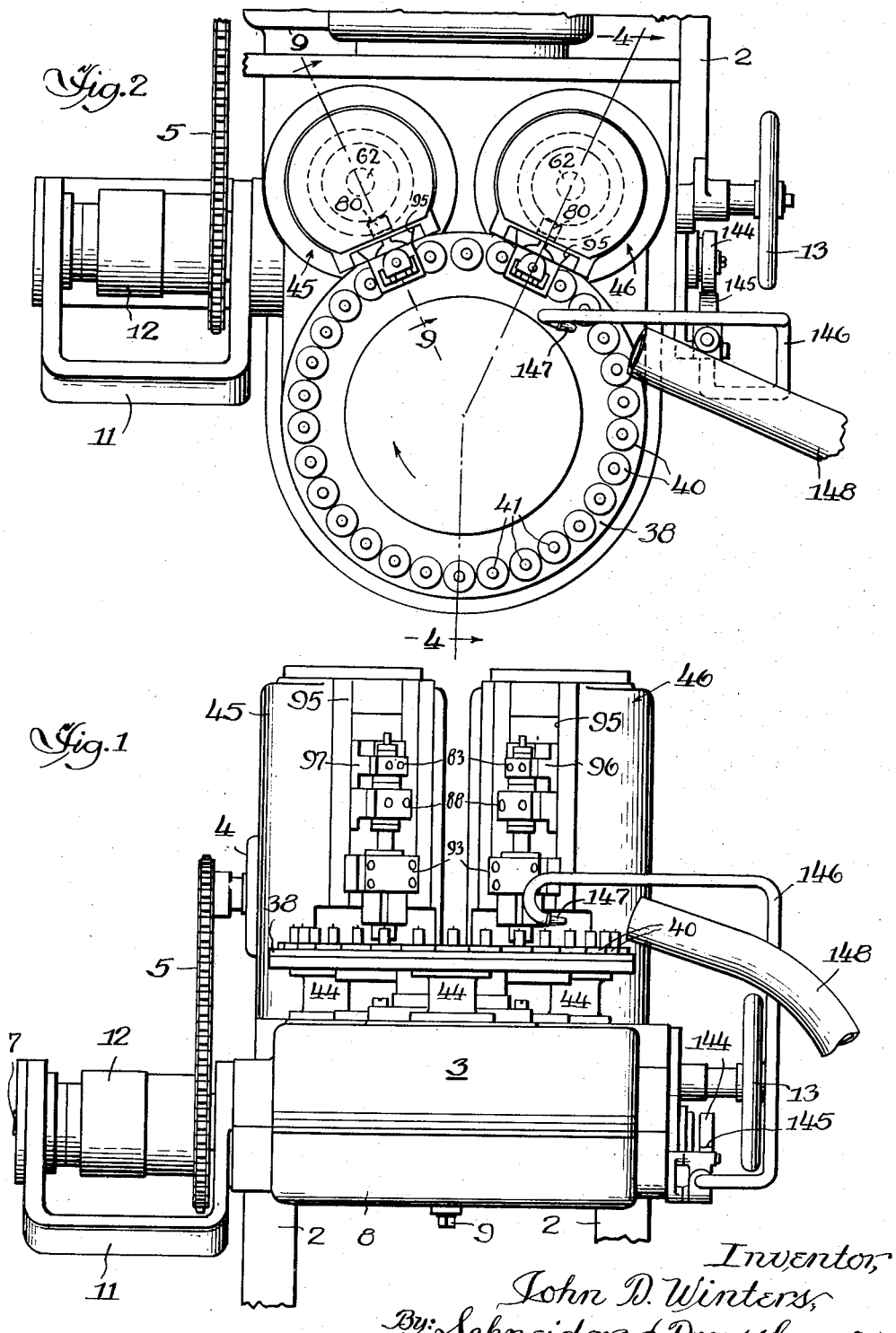

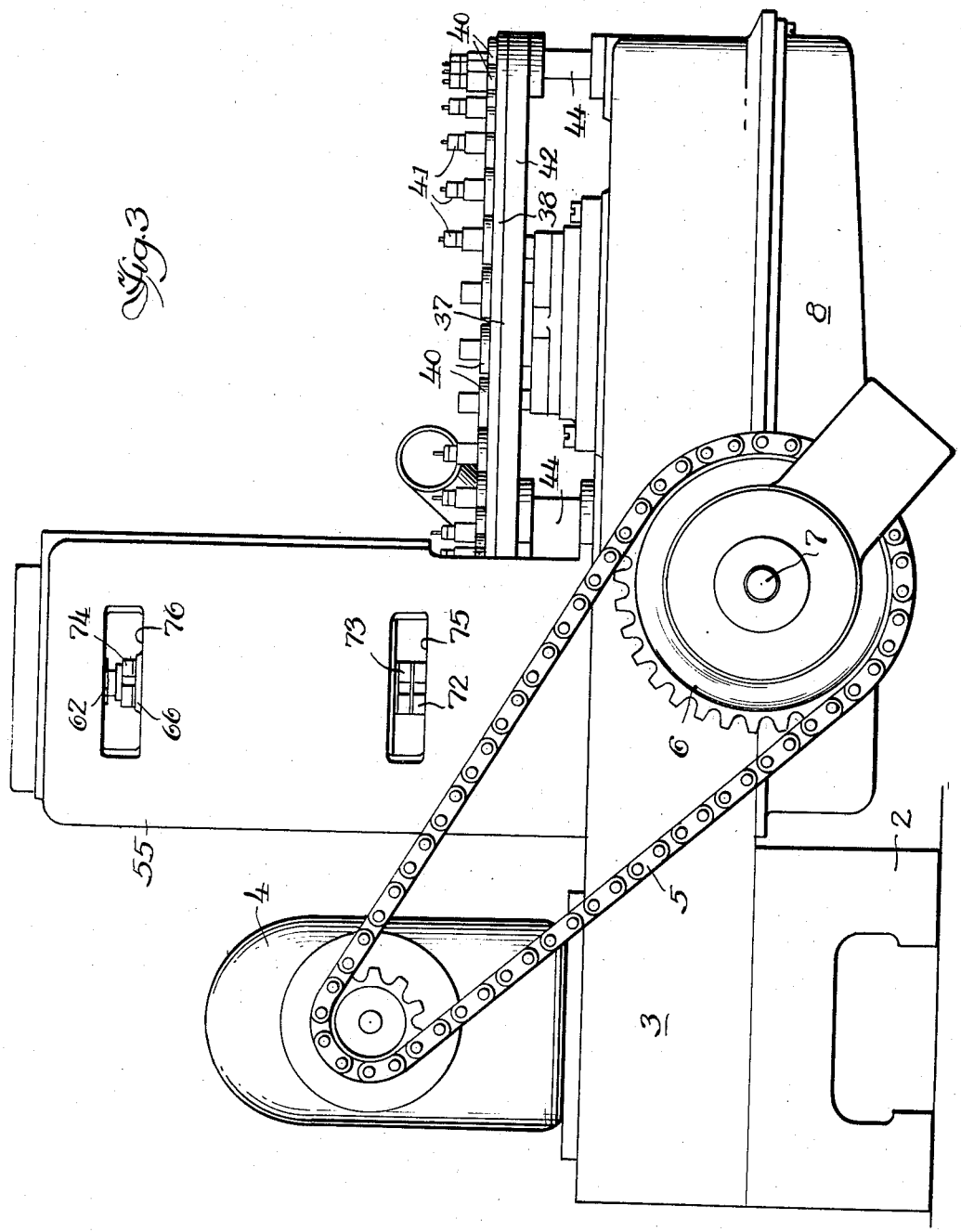

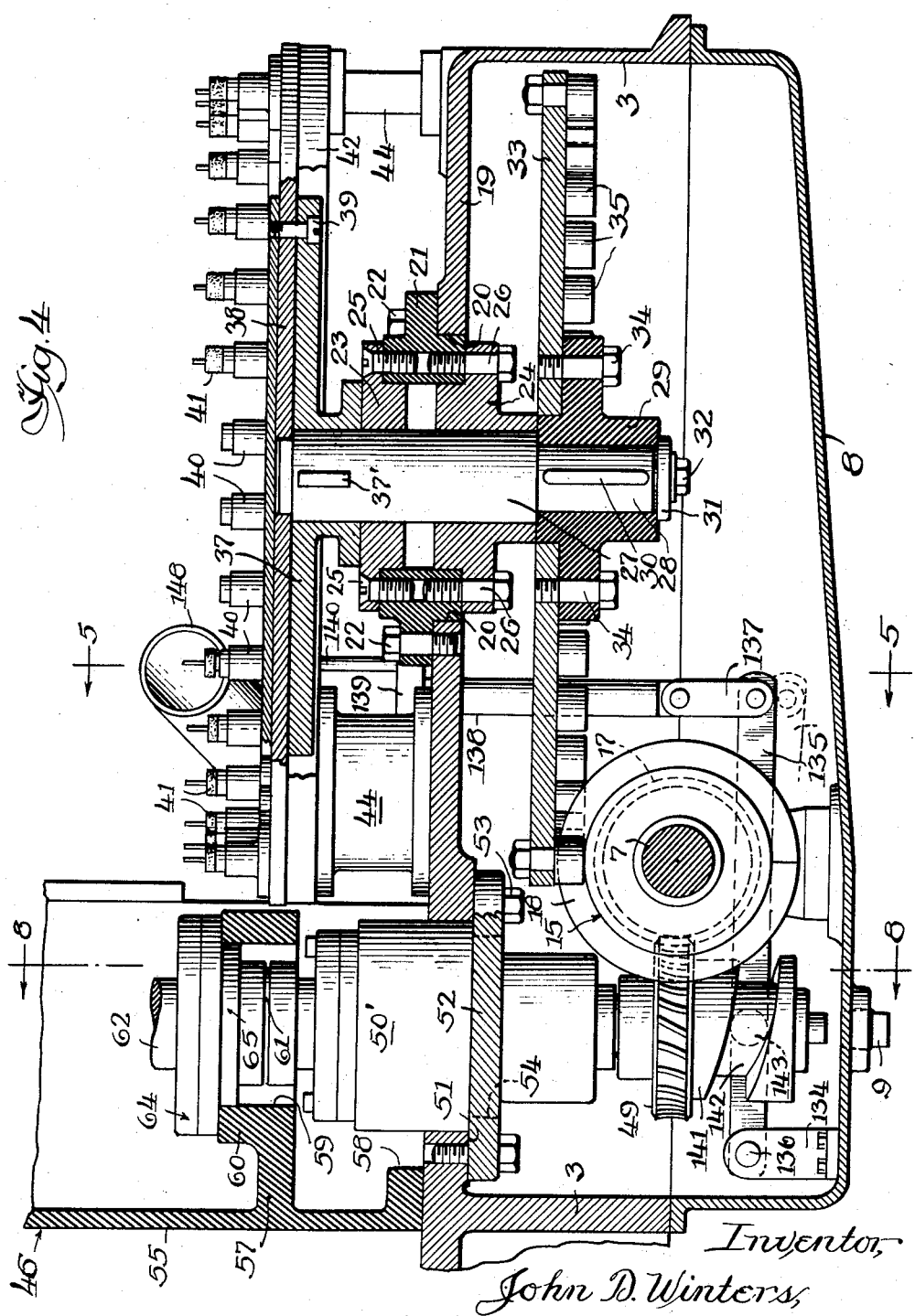

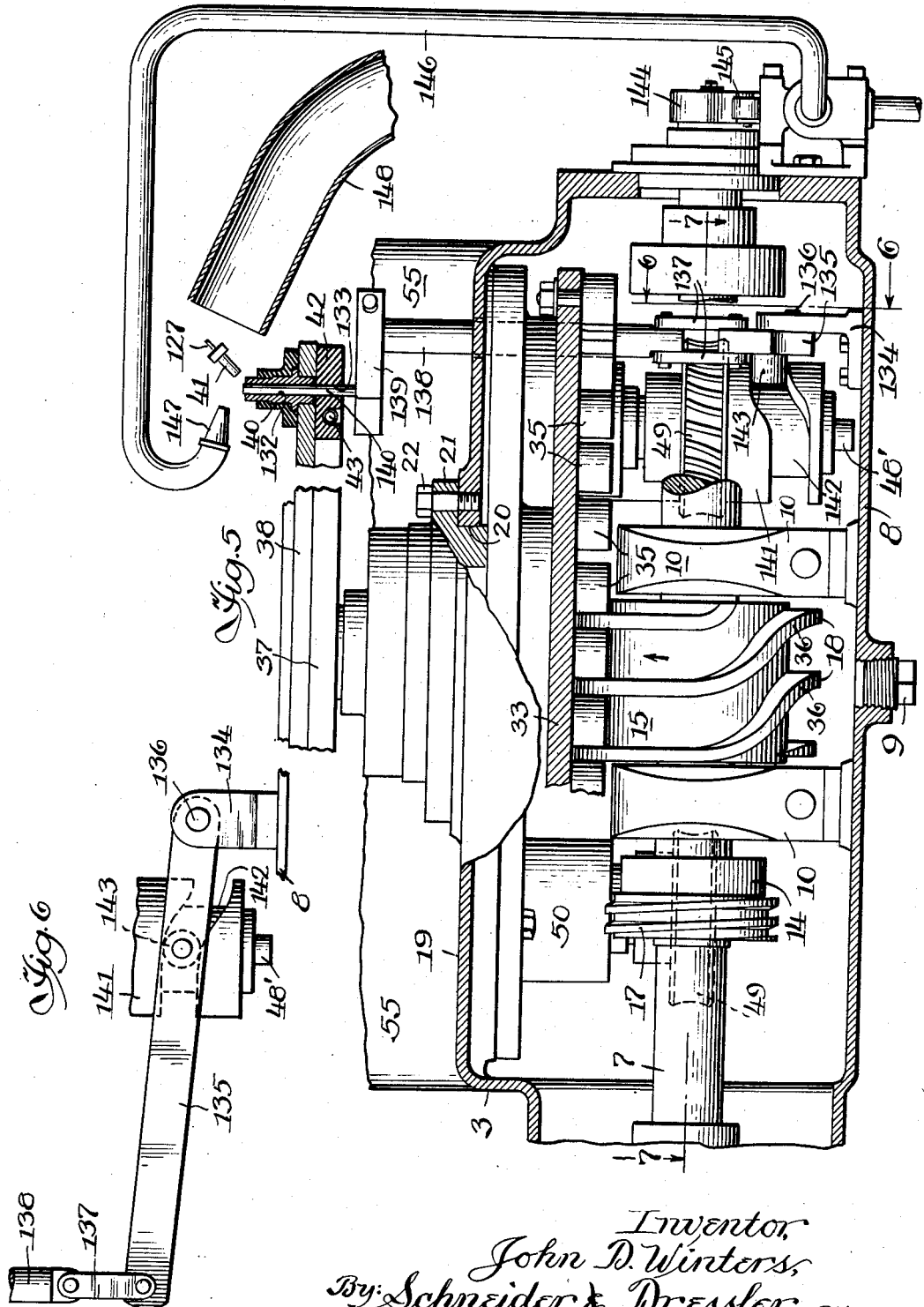

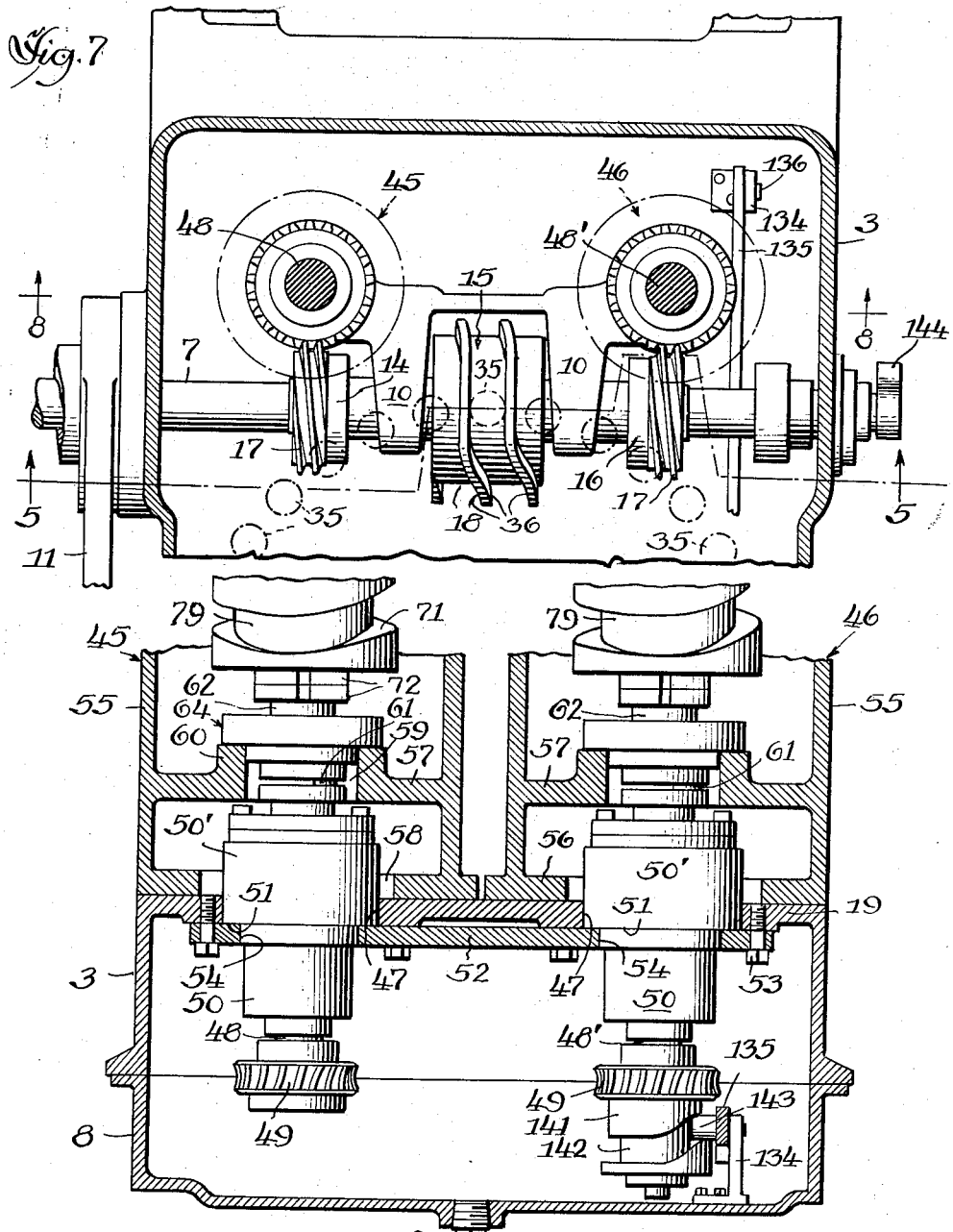

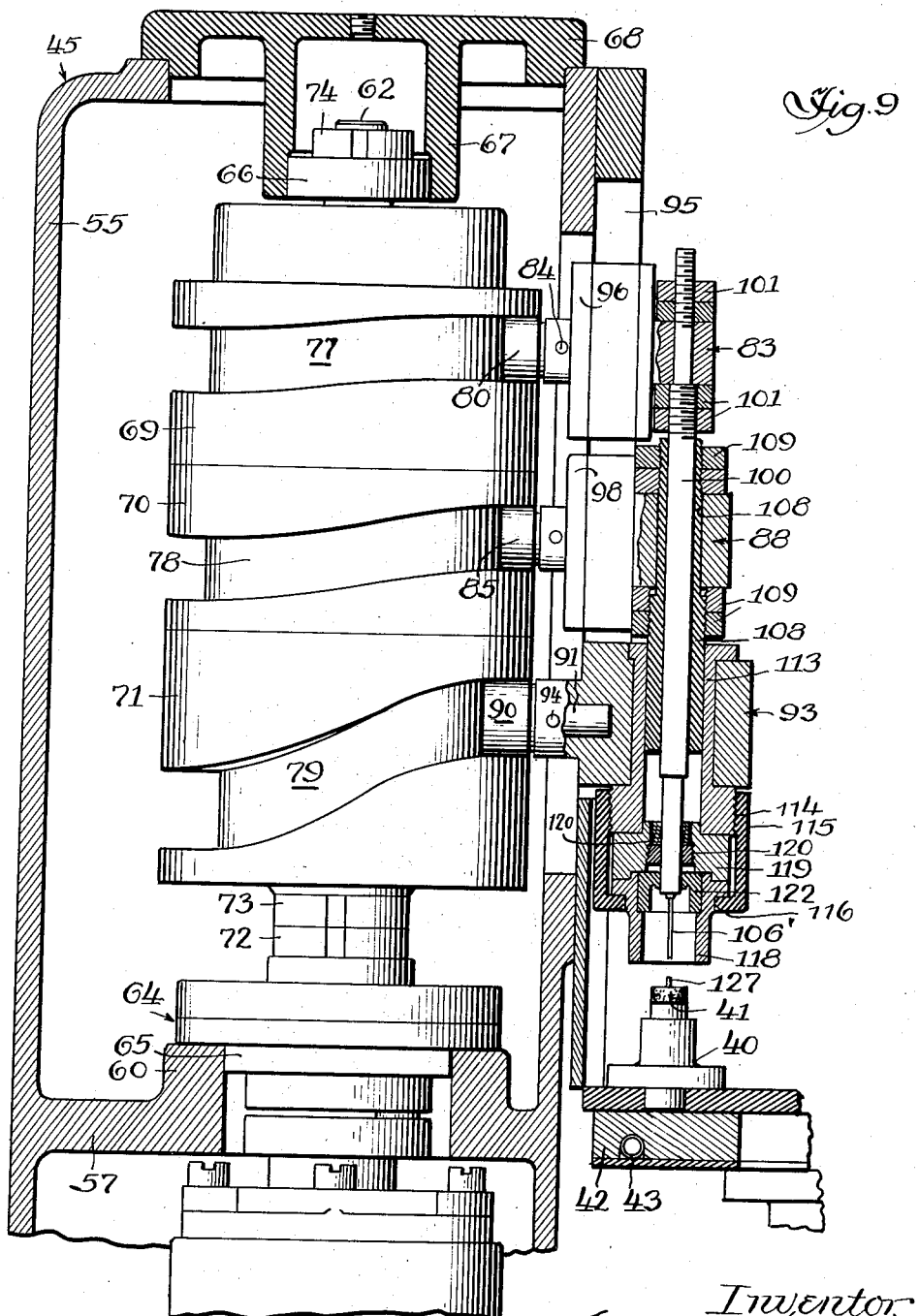

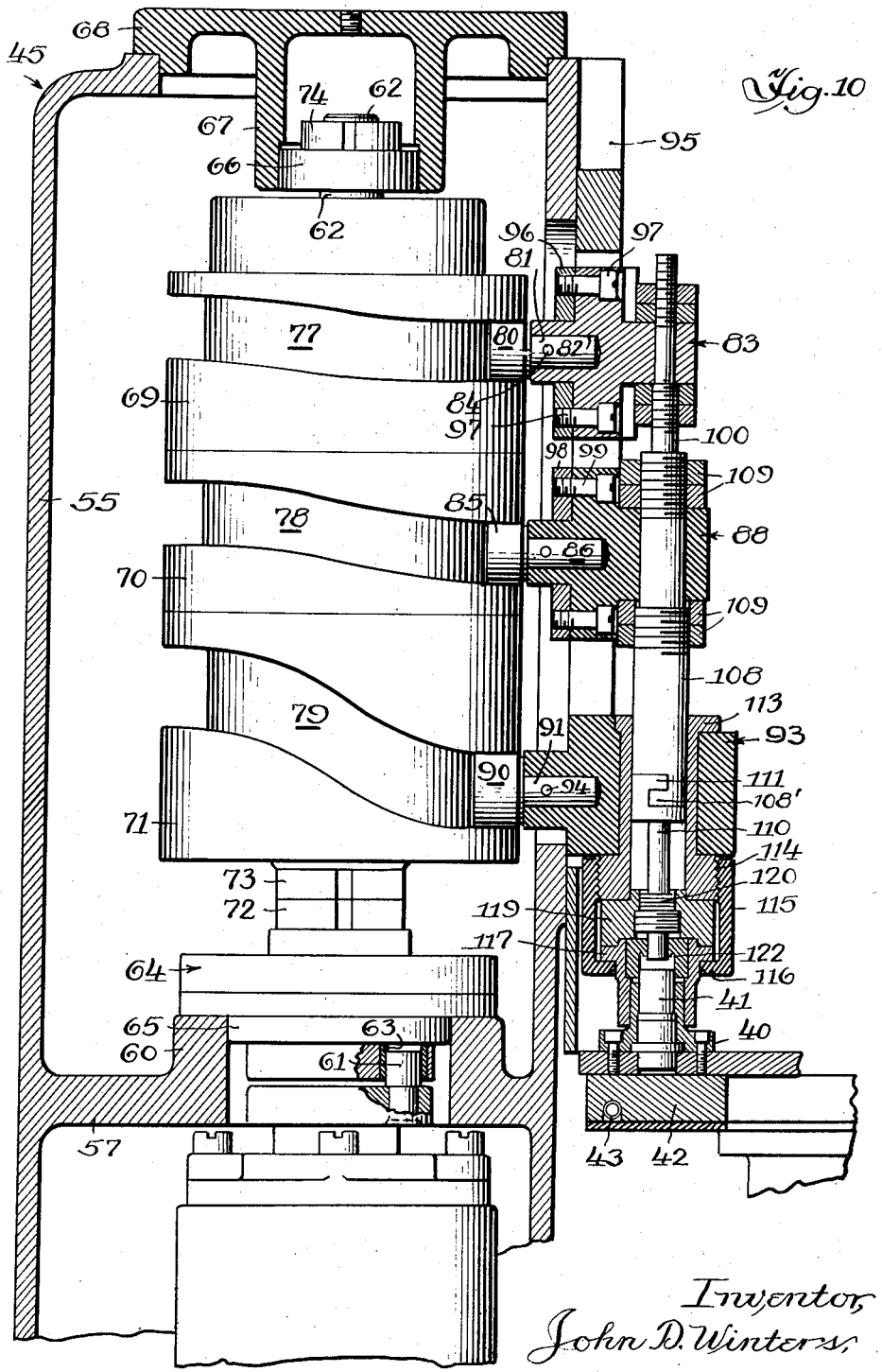

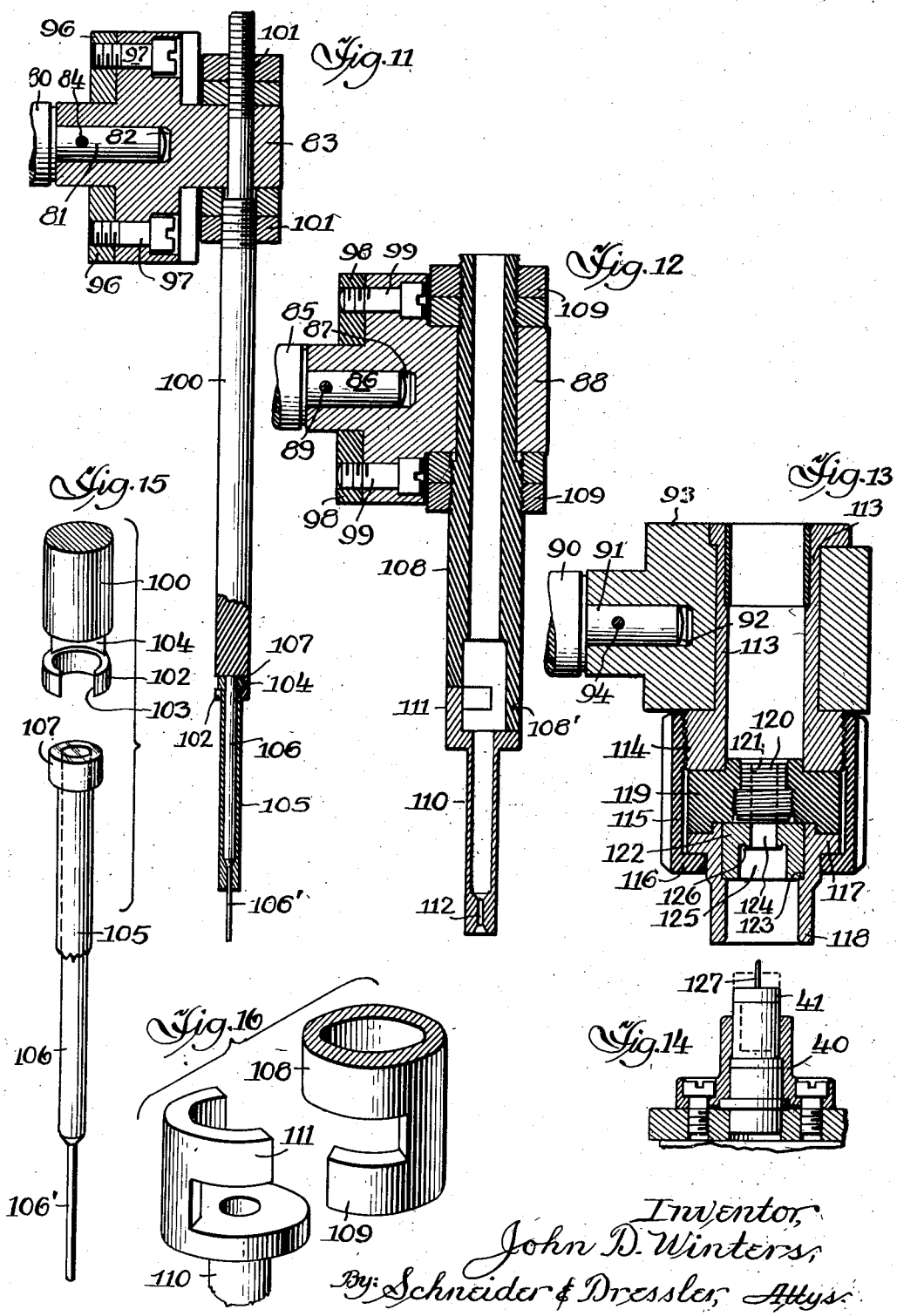

United States Patent Office 2,952,230
Patented Sept. 13, 1960

2,952,230

CRIMPING MACHINE

John D. Winters, Lake Bluff, Ill., assignor to Fansteel Metallurgical Corporation, a corporation of New York Filed June 2, 1954, Ser. No. 434,052

6 Claims. (Cl. 113—14)

This invention relates to a machine for crimping and sealing cans and particularly to a machine for crimping and sealing small metal cans forming part of an electrolytic capacitor assembly. While the machine forming the subject matter of this application is useful for other purposes, it has been particularly designed for crimping and sealing small cans having an upwardly extending centrally disposed wire or rod from the center thereof with the sealing and crimping occurring at the top of the can. The can forming part of an electrolytic capacitor, which is operated upon by this machine and sealed thereby, is fully disclosed in the copending application of Oliver S. Aikman, Serial No. 248,899, filed September 29, 1951, now Patent No. 2,744,217.

Crimping machines for operating upon conventional cans, in which for example food is packed, are well known and widely used. As a rule, the metal forming the can has several layers folded over to provide a tight and strong mechanical joint. The machine to be hereinafter described differs from such prior crimping machines in that the upper edge of the can body is curled inwardly and then, in a second operation crimped downwardly into a sealing washer. The can operated on is so small that it is completely filled by a small anode and several drops of water. The size of the can and the fact that a pin, namely the anode of the capacitor, projects from the center of the can contents upwardly above the top edge of the can, make it impossible to crimp the can with conventional apparatus.

In accordance with the present invention the cans, with their contents, are placed on a rotatable plate and carried successively to a curling head, a crimping head, and an ejector station where they are ejected and blown by a blast of air into a receiving chute. The curling and crimping heads are duplicates except for the dies which shape the upper edges of the walls of the can. Each of these heads includes three interrelated vertically moving operating units, and the movement of these operating units is accomplished by spiral cams which regulate the distance of the vertical movement and the rate of movement of the operating units. Each of the three vertically movable operating units moves at a different rate, and each has a different dwell at two different levels, so that the various parts of the operating units perform their various functions in the desired sequence.

Although the following specification describes the actions of the cam-controlled operating units in connection with a can-crimping and sealing machine, it should be understood that the invention is not to be so limited. The use of cams for controlling interrelated reciprocatory movements of operating machine parts is believed to be broadly new, and is advantageous in connection with any machines in which a smooth stop and smooth change of direction of the various operating parts is desirable.

The structure by means of which the above and other advantages of the invention are attained will be described in detail in the following specification, taken in conjunction with the accompanying drawings showing a preferred illustrative embodiment of the invention, in which:

Figure 1 is a front elevational view of the crimping machine with the supporting frame broken away;

Figure 2 is a top plan view;

Figure 3 is a side elevational view;

Figure 4 is a cross sectional view, taken substantially along the line 4—4 of Figure 2;

Figure 5 is a cross sectional view, taken generally along the lines 5—5 of Figure 4 and Figure 7;

Figure 6 is a fragmentary side elevational view of the ejecting mechanism, taken on the line 6—6 of Figure 5;

Figure 7 is a cross sectional view, taken along the line 7—7 of Figure 5;

Figure 8 is a cross sectional view, taken generally along the line 8—8 of Figure 4 and Figure 7;

Figure 9 is a vertical sectional view through the curling head, taken along the line 9—9 of Figure 1, and showing the curling mechanism in its uppermost position;

Figure 10 is a view similar to Figure 9, except that no can is in position and the curling mechanism is at the bottom of its stroke;

Figure 11 is a detail sectional view of the upper operating unit;

Figure 12 is a detail sectional view of the intermediate operating unit;

Figure 13 is a detail sectional view of the lower operating unit;

Figure 14 is a detail sectional view of a can holder with a can positioned for the curling or crimping operation;

Figure 15 is a fragmentary elevational view of the stripper pin and means for mounting it on the upper operating unit;

Figure 16 is a fragmentary perspective view of the coupling means for securing the tubular member to the intermediate operating unit;

Figure 17:
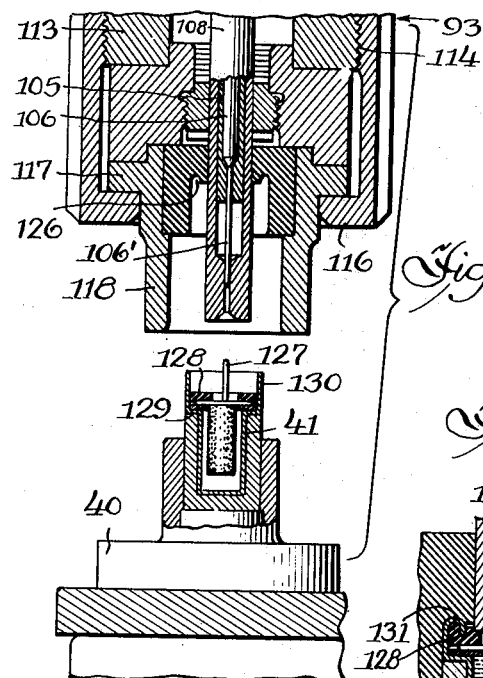
Figure 17 is a fragmentary sectional view showing the operating units of the curling heal just prior to engagement with the can to be curled.

In the drawings, referring particularly to Figures 1 to 5, the frame of the machine, which may be of any suitable design, is indicated generally by the reference numeral 2. Frame 2 constitutes a base for supporting the structure at a convenient height above floor level. As shown in Figure 3, base 2 supports a housing 3 on which a motor 4 is mounted in any suitable manner. Motor 4, acting through a chain 5 and a sprocket gear 6, drives the main drive shaft 7. Housing 3 is provided with a bottom 8 which serves as an oil case and is provided with a drain plug 9 (Figure 5). Bottom 8 also supports bearings 10 for main drive shaft 7. A bracket 11 extending from one side of housing 3 furnishes additional support for one end of shaft 7. A conventional clutch 12 is mounted on the main drive shaft 7 so that the shaft can be turned by means of a hand wheel 13 positioned outside housing 3 and connected to the main drive shaft by suitable gearing.

As shown in Figures 5 and 7, three concentric sleeves 14, 15 and 16 are rigidly secured to main drive shaft 7 in longitudinally spaced relationship. Sleeves 14 and 16 are provided with helical gears 17, which project laterally from their peripheral surfaces, for a purpose hereinafter described. A cam track 18, projecting laterally form the peripheral surface of sleeve 15, extends continuously around the circumference of the sleeve with the ends of the cam track adjacent opposite ends of the sleeve.

The top wall 19 of housing 3 is provided with an opening 20, and an annular collar 21 fitting within the opening is rigidly secured to housing 3 by means of bolts 22 or other conventional fastening means. A pair of bearings 23, 24, are secured to opposite surfaces of collar 21 by fastening means 25 and 26 respectively. Bearings 23 and 24 fit snugly around a shaft 27 which has a lower portion 28 of reduced diameter keyed to a flanged collar 29 by a spline 30 which fits into a groove (not shown) in the inner surface of collar 29. An end cap 31, held against the bottom of reduced shaft portion 28 by means of a bolt or screw 32, holds collar 29 against axial displacement relative to shaft 27.

A disk 33 is rigidly secured to collar 29 by means of a plurality of bolts 34. A plurality of cam rollers 35 are secured to the underside of disk 33 in uniformly spaced relationship adjacent the periphery of the disk. The diameter of each roller 35 is substantially equal to the lateral spacing between parallel portions of cam track 18. Cam track 18 engages two or three of the rollers 35 which are positioned immediately above sleeve 15, as shown in Figure 5. The cam track extends around the periphery of sleeve 15 and is provided with an offset 36 for each circumferential orbit. The offsets are parallel to each other and take up only a small portion of the circumferential travel of the cam track.

Cam track 18 rotates continuously along with main drive shaft 7 and sleeve 15 as long as motor 4 keeps operating. The cam track does not have any effect on the rollers 35 as long as the straight line portions of the track are in contact therewith. When offsets 36 move into engagement with rollers 35 the rollers are displaced laterally, and the next succeeding cam roller is engaged by the cam track simultaneously with the lateral displacement of the cam rollers previously engaged by the track. The successive lateral displacement of adjacent cam rollers causes an intermittent rotation of disk 33. The intermittent rotation of disk 33 is uniform as to the frequency with which the disk moves and the degree of movement between each pause.

The upper end of shaft 27 (Fig. 4) is keyed to a flanged plate 37 by means of a spline 37' which fits into a groove (not shown) in plate 37. The lower portion of plate 37 rests on the upper surface of bearing 23 and is rotatable thereon. A plate 38 is secured to the top of plate 37 by a plurality of screws 39. Plate 38 is larger in diameter than plate 37, and has a plurality of individual can holders 40 secured around its outer edge portion. A can 41 is placed into each holder at a predetermined point. The cans are positioned manually, but may be positioned by suitable machinery if desired. A heating ring 42 is positioned under the line of holders 40, and is provided with conventional heating elements 43 (Fig. 5) to keep the holders at a predetermined temperature to facilitate the curling and crimping operations hereinafter described. A plurality of brackets 44, carried on top wall 19 of housing 3, supports heating ring 42 and the outer edge of plate 38.

Referring to Figures 1 and 2, it will be seen that the rotation of plate 38 moves can holders 40 past work stations adjacent a curling head 45, and a crimping head 46. The curling and crimping heads are duplicates, except for the difference of shape of the curling die and the crimping die. Accordingly, the mechanism will be described only in connection with the curling head. It is understood that the mechanism of the crimping head is an exact duplicate. Where corresponding parts of the both mechanisms are identical, the same reference numerals will be used.

Referring to Figure 8, the top wall 19 of housing 3 is provided with openings 47 through which vertical drive shafts 48 and 48' for curling head 45 and crimping head 46 extend. Shafts 48 and 48' are driven by worm gears 49 engaging helical gears 17 on main drive shaft 7. Vertical drive shaft 48 is provided with bearings 50 and 50' of different outside diameters with an annular shoulder 51 extending outwardly beyond the circumference of the smaller bearing 50. Bearing 50' fits snugly within opening 47. A plate 52, bolted to top wall 19, as indicated at 53, is provided with an opening 54 concentric with opening 47 but smaller than it, to fit snugly around bearing 50. Shoulder 51 rests on the edge of plate 52 surrounding opening 54 to support the weight of shaft 48.

A housing 55 extending upwardly above housing 3 has a bottom wall 56 supported on top wall 19 of housing 3, and a partition wall 57 parallel to wall 56 and spaced a short distance above it. The portion of wall 56 overlying opening 47 is provided with an opening 58, and partition wall 57 is provided with an opening 59 concentric with openings 47, 54 and 58. The diameters of openings 58 and 59 are each larger than the portions of vertical drive shaft 48 which they surround, to provide clearance sufficient to permit housing 55 to be lifted from housing 3. The upper end of vertical drive shaft 48 terminates in opening 59. Partition wall 57 is provided with an upstanding flange 60 surrounding opening 59. Vertical drive shaft 48 is provided with a stud 61 which projects upwardly from its top and terminates below the upper edge of flange 60.

A vertical cam shaft 62 mounted in housing 55 has one end mounted in opening 59 and has a bushing 63 (Fig. 10), into which stud 61 is adapted to fit, so that shaft 62 is driven by shaft 48. Stud 61 and bushing 63 may be reversed, if desired, but both of these members must be offset the same distance from the center line of shaft 48 so that they can be interengaged for driving shaft 62 by rotation of shaft 48. The fit between stud 61 and bushing 63 is loose enough to permit easy separation when housing 55 and its associated mechanism are lifted vertically from housing 3.

As shown in Figures 9 and 10, the lower end of shaft 62 is provided with a bearing 64 which rests on the top of flange 60 to support shaft 62. A collar 65 mounted on shaft 62 directly below bearing 64 fits snugly within opening 59 to prevent lateral displacement of the lower end of shaft 62. The upper end of shaft 62 is provided with a bearing 66 fitting snugly within an annular flange 67 depending from a cap 68 forming a closure for the upper end of housing 55.

Three cams 69, 70 and 71 are mounted on vertical cam shaft 62 and are secured in place by locking collars 72 and 73, positioned adjacent the upper surface of bearing 64, and another locking collar 74 positioned just above bearing 66. As shown in Figure 3, housing 55 is provided with a pair of windows 75 and 76 to provide access to locking collars 72, 73 and 74 for purposes of adjustments.

Referring again to Figures 9 and 10, cams 69, and 70 and 71 are provided respectively wtih spiral cam tracks 77, 78 and 79. A cam roller 80, rotatably mounted in cam track 77, is provided with a shaft 81 fitting into a recess 82 in an upper operating unit 83 and secured thereto by means of a pin 84. A cam roller 85, rotatably mounted in cam track 78, is provided with a shaft 86 fitting into a recess 87 in an intermediate operating unit 88, and secured thereto by a pin 89. A cam roller 90, rotatably mounted in cam track 79, is provided with a shaft 91 fitting in a recess 92 in a lower operating unit 93, and secured thereto by a pin 94.

Cam housing 55 is provided with a vertically extending gibway 95 in which the operating units 83, 88 and 93 are slidable. Upper operating unit 83 is provided with a shoe 96, secured thereto by screws 97, to facilitate its vertical movement in gibway 95. A shoe 98 is similarly secured to intermediate operating unit 88 by screws 99. Cam tracks 77, 78 and 79 are arranged to cause each of the operating units to complete one cycle during each revolution of cam shaft 62. The cam tracks are shaped differently, however, so that the opening units move vertically at different speeds and have different dwells in their lowermost positions. The upper operating unit has the slowest vertical movement and the longest dwell in its lowermost position. The lower operating unit has the fastest vertical movement and has the shortest dwell in its lowermost position. The relationship between the vertical movements of the various operating units is important in connection with the curling and crimping operations hereinafter described.

The structure of the various operating units can be best understood by reference to Figures 11 to 16 of the drawings. The upper end of a stem 100 is secured to upper operating unit 83 by lock nuts 101. The lower end of stem 100 is provided with a tubular collar 102 having an open throat through part of its circumference, as indicated at 103. Collar 102 is spaced from the lower end of stem 100 by an integral web 104. A tubular stem 105, having a pin 106 projecting from its lower end, has a flange 107 at its upper end. Stem 105 is inserted through throat 103 with flange 107 seated on top of collar 102 to secure stems 100 and 105 in vertical alignment.

A tubular shaft 108 is secured at its upper end to intermediate operating unit 88 by means of lock nuts 109. Stem 100 fits within tubular shaft 108. The lower end of shaft 108 is cut away to provide an integral extension 108'. A tubular member 110 adapted to fit over stem 105 is provided at its upper end with an integral extension 111 complementary to extension 108' so that the upper end of tubular member 110 may be readily secured to the lower end of shaft 108. The lower end of pin 106 is reduced in diameter, as shown at 106', and the lower end of member 110 is restricted to provide a narrow opening 112 through which the reduced end 106' extends.

Lower operating unit 93 is provided with a tubular sleeve 113 extending vertically therethrough and adapted to receive shaft 108 which is positioned therein. The lower end of sleeve 113 extends below the lower edge of operating unit 93 and is provided with an exterior thread, as indicated at 114. A punch-retaining nut 115 is threaded on thread 114. The lower end of nut 115 is provided with an inturned annular flange 116 which engages the underside of a flange 117 intergral with a locating sleeve 118 adapted to fit over the sides of can holder 40 to insure proper location of the can for the curling and crimping operations.

An annular member 119, provided with centrally disposed packing 120, is clamped between the bottom of sleeve 113 and the top of locating sleeve 118. Packing 120 is provided with a central aperture 121 through which tubular member 110 extends. A die 122 is mounted in locating sleeve 118 and is retained in position by an annular shoulder 123 formed on the inner surface of locating sleeve 118 and the bottom of annular member 119. Die 122 is provided with an aperture 124 aligned vertically with aperture 121 in packing 120, through which tubular member 110 extends. Aperture 124 is counterbored, as indicated at 125, and the upper edge of the counterbore is grooved, as indicated at 126, to guide the upper edge of the can as it is curled inwardly by the downward movement of the die.

The curling and crimping operations will be best understood by reference to Figures 17 to 21 of the drawings. In Figure 17 the parts are shown with the operating units approaching the can 41 which is held in holder 40. The initial engagement between can 41 and the curling mechanism (Fig. 18) is the engagement of locating sleeve 118 with the outside of can holder 40. The sliding engagement of these parts insures proper vertical alignment of pin 106 with the pin 127 projecting upwardly from the can. The reduced end 106' of pin 106 then engages pin 127 in abutting end-to-end relationship. Pin 127 is the anode of the capacitor for which the machine of the present invention is particularly designed, but it will be obvious that the machine can be used to seal cans that do not have an element similar to pin 127. Can 41 is provided with an annular sealing gasket 128 surrounding pin 127 and supported on an annular shoulder 129 near the top of the can. The upper edge 130 of can 41 projects above sealing gasket 128.

When the pins 106 and 127 make contact in their end-to-end abutting relationship, cam roller 80 is in its lowermost position in cam track 77, and remains there while the intermediate and lower operating units continue their downward movement until the bottom of tubular member 110 engages gasket 128. The downward movement of member 110 causes the restricted opening 112 in its lower end to engage pin 127 just before member 110 engages gasket 128. If gasket 128 is not properly seated, tubular member 110 will force it downwardly into its seat. In this position of member 110, cam roller 85 is in its lowermost position and remains there, so that member 110 holds gasket 128 and can 41 down, while die 122 continues its downward movement to curl upper edge 130 of the can.

The downward movement of lower operating unit 93 brings die 122 downwardly and eventually causes groove 126 to engage the upper edge 130 of the can. Continued downward movement of operating unit 93 causes upper edge 130 of the can to follow the curve of groove 126 to assume an inwardly extending curl overhanging gasket 128 as shown in Figure 20.

Lower operating unit 93 starts its upward movement while tubular member 110 holds can 41 down and pin 106 holds pin 127 down. Pin 106 continues to hold pin 127 down when tubular member 110 starts its upward movement to strip the can just curled from the lower and intermediate operating units. After the stripping action is completed, pin 106 is moved upwardly away from the pin 127, and the can is ready for rotational movement of plate 38 which carries it to crimping mechanism 46.

Figure 21:
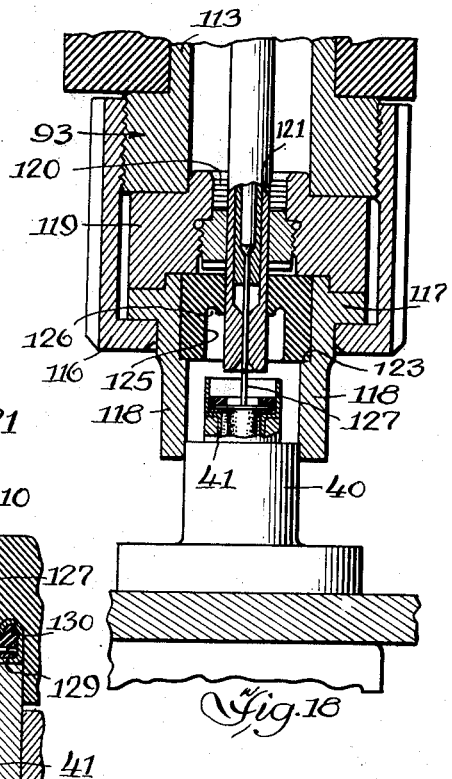
Figure 21 is a view, similar to Figure 20, with the operating units of the crimping head at their lowermost position just after the upper edge of the can has been crimped into its final, sealed position.
Figure 18:
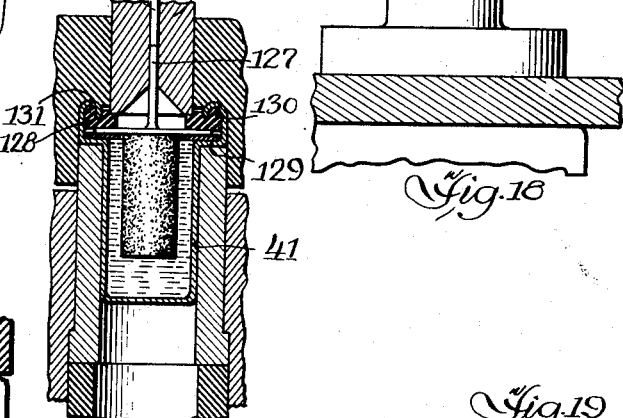
Figure 18 is a view, similar to Figure 17, showing the stripping pin engaging the capacitor pin, and the lower operating unit just engaging the can holder.

As previously stated, crimping mechanism 46 is a duplicate of curling mechanism 45 except that the crimping groove 131, similar to groove 126, is shaped to force the curled upper edge 130 downwardly into gasket 128 to seal the can and its contents, as shown in Figure 21. After the crimping operation, further rotation of plate 38 carries the sealed can to the ejector station shown in Figures 2, 4 and 5.

Figure 20:
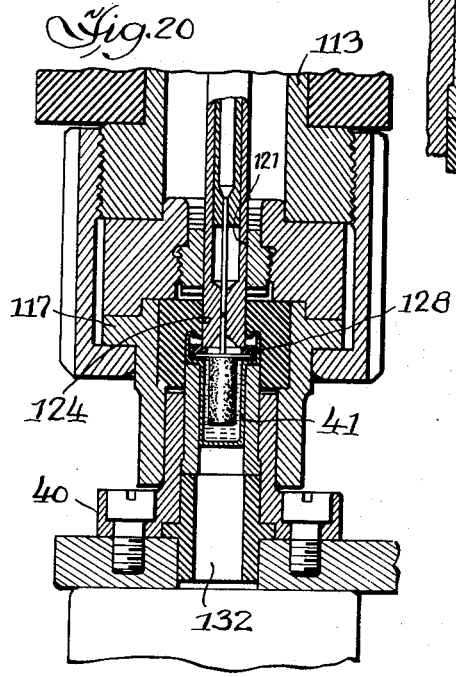
Figure 20 is a view with all three operating units at the bottom of their strokes, with the upper edge of the can curled.
Figure 19:
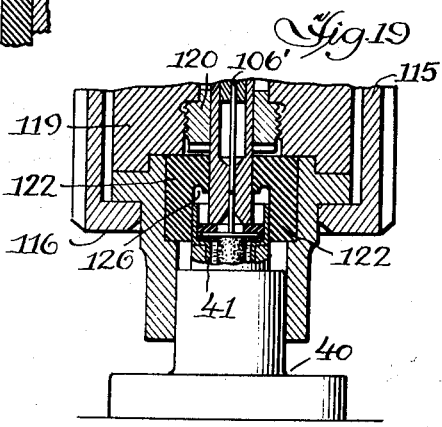
Figure 19 is a view similar to Figure 17, showing the intermediate operating unit engaging the sealing gasket of the can just before the curling die engages the upper edge of the can.

Each can holder 40 is provided with a centrally disposed vertical opening 132, as shown in Figure 20. Heating ring 42 is also provided with a corresponding opening 133 (Fig. 5) at the ejector station so that when each can holder reaches the ejector station openings 132 and 133 are aligned vertically.

The ejector mechanism comprises a bracket 134 rigidly mounted on the inside surface of bottom 8 of housing 3, a lever 135 pivotally connected at one end to bracket 134, as indicated at 136, and at its other end to a pair of links 137, as shown in Figures 4, 5 and 6. Links 137 are connected at their upper ends to a vertical rod 138 depending from a cross bar 139. An ejecting pin 140 projects upwardly from cross bar 139 in vertical alignment with opening 133 and extends into the opening.

Vertical drive shaft 48' is extended downwardly, as shown in Figures 4, 5 and 8. A cam 141 mounted on shaft 48' near its lower end is provided with a spiral cam track 142 in which is mounted a cam roller 143 projecting laterally from lever 135. The engagement of worm gear 49 with helical gear 17 on main drive shaft 7 rotates cam 141 and thereby moves lever 135 pivotally to reciprocate ejecting pin 140 vertically.

A cam 144 (Fig. 5) mounted on the end of main drive shaft 7 acts against a roller 145 to operate a valve (not shown) which regulates an air blast carried by a pipe 146. Pipe 146 is provided with a nozzle 147 positioned above and adjacent the ejector station. Since cam 18, which controls the vertical position of plate 38, cam 141, which controls the vertical position of ejecting pin 140, and cam 144, which controls the flow of air through pipe 146, are all operated from main drive shaft 7, they are synchronized. When plate 38 brings a can holder 40 into the ejecting position, ejector pin 140 is moved upwardly to push can 41 out of its holder, and an air blast discharged from nozzle 147 blows it sideways. A receiving chute 148, leading to a suitable receiving station (not shown), has an open end positioned opposite nozzle 147 to catch each can 41 as it is blown away from holder 40.

The complete operation of the machine may be summarized as follows. Cans to be crimped into sealed condition are inserted individually into holders mounted on a rotatable plate. The plate is rotated intermittently by a cam driven by a continuously rotating main drive shaft. As each can reaches a predetermined station, a plurality of interrelated cams moves a plurality of cooperating units downwardly to locate the operating mechanism laterally with respect to the can with sufficient accuracy so that a vertically moving pin depending from one of the operating units will engage a pin projecting upwardly from the can in abutting end-to-end relationship while another operating unit moves downwardly to hold the can and its sealing gasket in position, and a curling die moves downwardly to engage the upper edge of the can to curl it inwardly and downwardly. The curled can, which is still positioned in its holder, is then moved by the rotatable plate into the crimping station, in which the sequence of operating unit movements is repeated, except that in this operation the upper edge of the can is crimped into the sealing gasket to completely seal the can. The rotatable plate then carries the sealed can into the ejecting station, in which an ejecting pin moves upwardly to push the can from its holder, and a blast of air blows the ejected can into a receiving chute.

Although I have described a preferred embodiment of my invention in considerable detail, it will be understood that the description thereof is intended to be illustrative rather than restrictive, as many details may be modified or changed without departing from the spirit or scope of the invention. Accordingly, I do not desire to be restricted to the exact details of construction described.

I claim.

1. In a machine for sealing cans, a horizontally disposed rotatable plate provided with a plurality of can holders in uniformly spaced relationship, means to rotate said plate intermittently to move said can holders in a continuous path with stops of uniform duration at each of a plurality of stations, curling means at one of said stations to curl the upper edge of can seated in the can holder at said station inwardly and downwardly during said stop, and crimping means at another of said stations to crimp the curled upper edge of a can seated in the can holder at said last-mentioned station during said stop, said two last-mentioned means each comprising a vertical drive shaft, a plurality of cams operable by said drive shaft, and a plurality of interrelated operating units each driven by one of said cams, two of said operating units engaging different parts of a can, the upper edge of which is to be curled and subsequently crimped, to insure proper positioning of said can during the curling and crimping operations, another of said operating units of said curling means carrying a curling die, and another of said operating units of said crimping means carrying a crimping die, each of said dies engaging the upper edge of the can at its station while said can is engaged by said two first-mentioned units, said dies being movable downwardly to curl the upper edge of said can inwardly and downwardly at one of said stations, and to crimp it into sealing position at the other of said stations.

2. In a machine for sealing cans, a horizontally disposed rotatable plate provided with a plurality of can holders in uniformly spaced relationship, means to rotate said plate intermittently to move said can holders in a continuous path with stops of uniform duration at each of a plurality of stations, and means at one of said stations to curl the upper edge of a can seated in the can holder at said station inwardly and downwardly during said stop, said curling means comprising a vertical drive shaft, a plurality of cams operable by said drive shaft, each of said cams having a continuous track extending around the periphery thereof, each of said cam tracks having a horizontal lower level, said lower levels being of different lengths to provide dwells of different durations, and a plurality of vertically spaced coaxially arranged operating units disposed above said can holders, each of said units having secured thereto a cam follower mounted in one of said cam tracks, whereby uniform rotation of said cams imparts varying vertical movement to said operating units, said operating units sequentially engaging different upper parts of said can holder and a can seated in said holder, to insure proper positioning thereof during downward movement of said operating units and finally engaging the upper edge of said can to curl it inwardly and downwardly.

3. In a machine for sealing cans, a horizontally disposed rotatable plate provided with a plurality of can holders in uniformly spaced relationship, means to rotate said plate intermittently to move said can holders in a continuous path with stops of uniform duration at each of a plurality of stations, means at one of said stations to curl the upper edge of a can seated in the can holder at said station inwardly and downwardly during said stop, said curling means comprising a vertical drive shaft, a plurality of cams operable by said drive shaft, each of said cams having a continuous track extending around the periphery thereof, each of said cam tracks having a horizontal lower level, said lower levels being of different lengths to provide dwells of different durations, and a plurality of vertically spaced operating units each having secured thereto a cam roller mounted in one of said cam tracks whereby uniform rotation of said cams imparts varying vertical movement to said operating units, the upper operating unit having the longest dwell in its lower position, and the lower operating unit having the shortest dwell in its lower position, a curling die carried by said lower operating unit, the upper operating units engaging a can seated in the holder at said station to hold it in proper position while said lower operating unit moves said die downwardly into curling engagement with the upper edge of said can.

4. In a machine for sealing cans, a horizontally disposed rotatable plate provided with a plurality of can holders in uniformly spaced relationship, means to rotate said plate intermittently to move said can holders in a continuous path with stops of uniform duration at each of a plurality of stations, and means at one of said stations to crimp the upper edge of a can seated in the can holder at said station, said last-mentioned means comprising three vertically spaced cams mounted on a common vertical shaft driven by said means to rotate said plate, each of said cams having vertical offsets increasing from the upper cam to the lower cam, and a plurality of coaxially arranged vertically movable can component aligning and engaging and can crimping units, each of said units being operatively connected to one of said cams, whereby rotation of said cams at a uniform speed moves said can component aligning and engaging and can crimping units vertically in predetermined relationship, the can-engaging units moving into can component aligning position prior to the engagement of said crimping unit with the upper edge of the can to be crimped.

5. In a machine for sealing cans, a horizontally disposed rotatable plate provided with a series of can holders in uniformly spaced relation, a main drive shaft, a cam operable by said drive shaft to impart intermittent rotational movement to said plate whereby each of said can holders moves along a closed path in a horizontal plane with stops at each of a plurality of stations, means at one of said stations operable to crimp the upper edge of a can seated in the can holder positioned at said station downwardly and inwardly during said stop, said means comprising a plurality of vertically spaced operating units, a can component aligning and engaging member mounted in one of said operating units, a crimping die mounted in another of said operating units, a vertical drive shaft, intermeshed gears on said main drive shaft and said vertical drive shaft to rotate said vertical drive shaft, a plurality of cams on said vertical drive shaft, each of said operating units being operatively connected to one of said plurality of cams, whereby said operating units are reciprocated vertically in predetermined relationship to move said can component aligning and engaging member into alignment with components of said can and to move said crimping die into crimping engagement with said can while it is held in position by said can-engaging member, and can-ejecting means comprising another cam mounted on said vertical drive shaft, an ejecting pin engageable with a can positioned at said last-mentioned station, and a lever operable by said last-mentioned cam to move said ejecting pin upwardly to remove said can from its holder.

6. In a machine for sealing cans, a horizontally disposed rotatable plate provided with a series of can holders in uniformly spaced relation, a main drive shaft, a cam operable by said drive shaft to impart intermittent rotational movement to said plate whereby each of said can holders moves along a closed path in a horizontal plane with stops at each of a plurality of stations, means at one of said stations operable to crimp the upper edge of a can seated in the can holder positioned at said station downwardly and inwardly during said stop, said means comprising a plurality of vertically spaced operating units, a can component aligning and engaging member mounted in one of said operating units, a crimping die mounted in another of said operating units, a vertical drive shaft, intermeshed gears on said main drive shaft and said vertical drive shaft to rotate said vertical drive shaft, a plurality of cams on said vertical drive shaft, each of said operating units being operatively connected to one of said plurality of cams, whereby said operating units are reciprocated vertically in predetermined relationship to move said can component aligning and engaging member into alignment with components of said can and to move said crimping die into crimping engagement with said can while it is held in position by said can component aligning and engaging member, can-ejecting means at another station, said ejecting means comprising another cam mounted on said vertical drive shaft, an ejecting pin engageable with a can positioned at said last-mentioned station, and a lever operable by said last-mentioned cam to move said ejecting pin upwardly to remove said can from its holder, a receiving chute adjacent said can holder at said ejector station, an air line having an discharge nozzle adjacent said can holder to blow the can ejected from the can holder into said receiving chute, a valve for controlling the flow of air through said nozzle, and a cam for operating said valve, said valve-operating cam being mounted on said main drive shaft.

References Cited in the file of this patent
UNITED STATES PATENTS

| 871,383 | Allen | Nov. 19, 1907 |
| 1,846,319 | Dister | Feb. 23, 1932 |
| 2,165,132 | Curtin | July 4, 1939 |
| 2,170,821 | Hothersall et al. | Aug. 29, 1939 |
| 2,218,102 | Van Blarcom | Oct. 15, 1940 |
| 2,282,959 | Gibbs | May 12, 1942 |
| 2,386,787 | Geertsen | Oct. 16, 1945 |
| 2,392,728 | Diezel | Jan. 8, 1946 |
| 2,527,373 | Parson | Oct. 24, 1950 |
| 2,555,700 | O'Neil | June 5, 1951 |
| 2,604,258 | Murname et al. | July 22, 1952 |
| 2,752,745 | Pechy | July 3, 1956 |

UNITED STATES PATENT OFFICE
CERTIFICATE OF CORRECTION

Patent No. 2,952,230                September 13, 1960

John D. Winters

It is hereby certified that error appears in the printed specification of the above numbered patent requiring correction and that the said Letters Patent should read as corrected below.

Column 2, line 41, for "heal" read -- head --; column 3, line 9, for "form" read -- from --; column 4, line 66, before "70" strike out "and"; column 5, line 12, for "opening" read -- operating --; line 54, for "intergral" read -- integral --; column 7, line 60, before "can", first occurrence, insert -- a --; column 10, line 21, for "an" second occurrence, read -- a --.

Signed and sealed this 11th day of April 1961.

(SEAL)
Attest:
ERNEST W. SWIDER

Attesting Officer

ARTHUR W. CROCKER
Acting Commissioner of Patents